(No Model.)
H. B. SCUTT.
Barbed Wire for Fences.
No. 232,372. Patented Sept. 21, 1880.
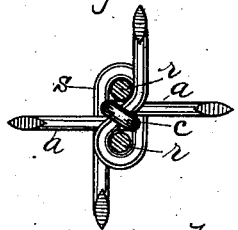
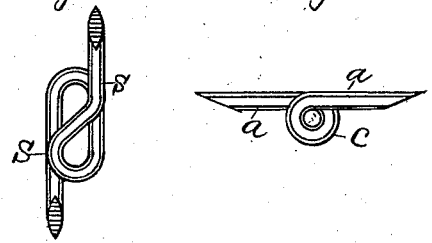
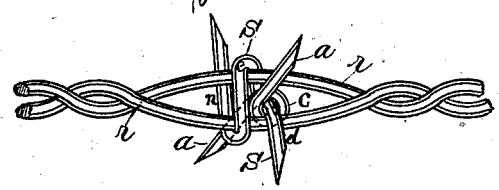
Witnesses
Thos. H. Hutchins
Wm. J. Hutchins
Inventor
Hiram B. Scutt

UNITED STATES PATENT OFFICE.

HIRAM B. SCUTT, OF JOLIET, ILLINOIS.

BARBED WIRE FOR FENCES.

SPECIFICATION forming part of Letters Patent No. 232,372, dated September 21, 1880.

Application filed May 27, 1880. (No model.)

*To all whom it may concern:*

Be it known that I, HIRAM B. SCUTT, of the city of Joliet, in Will county and State of Illinois, have invented certain Improvements in Barbed Wire for Fences, the construction and operation of which I will proceed to explain, reference being had to the annexed drawings, in which—

Figure 1 is a cross-section; Figs. 2 and 3, plan views of the barbs, and Fig. 4 a perspective view.

In that class of barbed-wire fences in which one or more barbs are wound around and between the longitudinal strands that compose the fence it has been found in practice that the barbs heretofore intertwined with or secured upon the longitudinal strands are very liable to bend and slip upon the strands, and thus become inoperative in turning cattle. To remedy this difficulty the barbs have been made of comparatively stout wire and have had several turns around the longitudinal wires without overcoming the defect, which moreover entails extra expense for wire, and the additional turns given to the barbs around the main wires entail more complications in the machinery and take more time in making.

The object of my invention is to overcome these defects, and to make with the least possible expense a good strong barbed wire, the barbs of which will not be easily bent out of place, and which will not slip. To accomplish this I so dispose the barbs that all their points save one are supported on all sides, and are thus prevented from bending with any force they are liable to be exposed to in ordinary use, as will be hereinafter more fully set forth.

In the drawings, *r r* represent two of the ordinary longitudinal wires or strands, and *a a* (see Fig. 3) the pointed ends of a barb projecting in opposite directions, and provided with a central loop, *c*, which barb is inserted between the longitudinal strands *r* with its pointed ends projecting perpendicularly, or nearly so, from the strands.

S (see Figs. 1, 2, and 4) represents a second barb, having one of its pointed ends *d* passed through the loop *c* of the other barb and between the longitudinal strands, and is then bent under one of them, thence upward and over the other wire, and again downward past the lower wire, thus binding the longitudinal wires and the barbs together.

It will be seen that this construction or arrangement of the wires insures several important advantages over the system usually employed, viz: All except one of the projecting ends of the barbs are supported on all sides, thus securely bracing them and preventing their being easily bent. The peculiar manner in which the barbs and longitudinal wires are intertwined prevents the barbs turning even if slightly loosened. A lighter wire may be employed for the barbs and yet have equal strength; and a smaller quantity of wire is used than in those where both barbs are wound around both longitudinal wires, which not only lessens the cost of the wire used in making the barbs, but cheapens the manufacture of the barbed wire, because, there being less turns to make in securing the barbs, they can be fastened on at a more rapid rate, and the machinery to be employed may be less complicated.

Having thus described my invention, what I claim as new, and desire to secure by Letters Patent, is as follows, to wit:

1. A barbed fence-wire formed of two longitudinal wires, having between them one barb with two points and a loop in its middle, secured in position by passing one end of another barb through said loop and then winding the other end of said barb around both longitudinal wires, substantially as described.

2. The barbed-wire fence herein described, consisting of the twisted longitudinal strands *r r*, barb *a c a*, formed with a loop, *c*, introduced between the strands, and having pointed ends projecting in opposite directions, and a second barbed wire, S, passing through the loop *c* and between the longitudinal strands, and thence passing around both longitudinal strands, substantially as set forth, so that all but one of the pointed ends of the barbs are supported on all sides, and thus prevented from bending, and the barbs from longitudinal or lateral movement, substantially as described.

HIRAM B. SCUTT.

Witnesses:
THOS. H. HUTCHINS,
WM. J. HUTCHINS.